United States Patent
Chou

(10) Patent No.: US 8,471,958 B2
(45) Date of Patent: Jun. 25, 2013

(54) METHOD FOR CONTROLLING DISPLAY DEVICE

(75) Inventor: Yu-Pin Chou, Miao-Li Hsien (TW)

(73) Assignee: Realtek Semiconductor Corp., Hsinchu (TW)

( * ) Notice: Subject to any disclaimer, the term of this patent is extended or adjusted under 35 U.S.C. 154(b) by 1532 days.

(21) Appl. No.: 11/936,058

(22) Filed: Nov. 6, 2007

(65) Prior Publication Data
US 2008/0106641 A1 May 8, 2008

(30) Foreign Application Priority Data

Nov. 7, 2006 (TW) .............................. 95141141 A

(51) Int. Cl.
*H04N 7/01* (2006.01)
(52) U.S. Cl.
USPC .......................... 348/441; 348/445; 348/448
(58) Field of Classification Search
USPC ........................ 348/441, 445, 448
See application file for complete search history.

(56) References Cited

U.S. PATENT DOCUMENTS

| 5,442,403 | A | * | 8/1995 | Yasumoto et al. | 348/432.1 |
| 6,384,865 | B1 | * | 5/2002 | Numata | 348/448 |
| 7,079,122 | B2 | * | 7/2006 | Morita | 345/204 |
| 2005/0122425 | A1 | * | 6/2005 | Hwung et al. | 348/376 |
| 2005/0219188 | A1 | * | 10/2005 | Kawabe et al. | 345/94 |
| 2007/0040941 | A1 | * | 2/2007 | Lin et al. | 348/556 |

FOREIGN PATENT DOCUMENTS

| JP | 6350976 | 12/1994 |
| JP | 3799048 | 7/2006 |
| TW | 559771 | 11/2003 |

* cited by examiner

*Primary Examiner* — Pankaj Kumar
*Assistant Examiner* — Franklin Andramuno
(74) *Attorney, Agent, or Firm* — McClure, Qualey & Rodack, LLP

(57) ABSTRACT

A method for controlling a display device is disclosed. The method includes receiving an input video image having a plurality of active scan lines, controlling the display device to display a plurality of background scan lines on a first display area with a first scan line frequency, and controlling the display device to display an output image on a second display area with a second scan line frequency. A second aspect ratio of the output image is substantially equal to a first aspect ratio of the input video image. The second scan line frequency is substantially lower than the first scan line frequency.

7 Claims, 2 Drawing Sheets

METHOD FOR CONTROLLING DISPLAY DEVICE

BACKGROUND OF THE INVENTION

1. Field of the Invention

The present invention relates to video data display, and more particularly, to a method for controlling a display device to maintain a same aspect ratio of input video images and output images.

2. Description of the Prior Art

Display devices (such as TVs, LCD monitors, PDP monitors, and projectors, etc.) can be utilized to display static images or dynamic video. Display devices are one of the most popular electronic devices available on the market.

Different video formats usually have different resolutions and aspect ratios. Taking Video Graphics Array (VGA) format as an example, the resolution and aspect ratio of VGA format are 640*480 and 4:3 respectively. The resolution and aspect ratio of Super Extended Graphics Array (SXGA) format are 1280*1024 and 5:4 respectively. When the resolution of a display device is different from that of received video signals, it is necessary to scale the received input video image first in order to display the video image correctly.

In general, video scaling will maintain a full frame display as far as possible. For example, if the resolution of an input video image is 640*480, and the resolution of a display device is 1280*1024, then the horizontal part of the input frame will be scaled up to be 2 times larger and the vertical part of the input frame will be scaled up to be 2.133 times larger for the full frame display. This scaling method for maintaining the full frame display does not require a large buffering space and it can maintain balance between the input data stream and the output display data stream via a proper controlling scheme. However, there are problems regarding the display ratio of the video (such as problems of objects becoming narrower or wider in the output image).

If the aspect ratio is required to be constant, then the horizontal and vertical scaling ratios must be the same, and remnant areas on the display device will be replaced by a specific background color. For example, if the resolution of an input video image is 640*480, and the resolution of a display device is 1280*1024, then the horizontal part and vertical part of the input frame can both be scaled up to be two times larger to become a resolution of 1280*960, and a final output frame with a resolution of 1280*1024 will be formed by adding 32 background scan lines above and below respectively. In this method, output timing of the conventional display device will be "maintaining the same display time of every horizontal scan line", i.e. the conventional display device requires the same time to display each scan line of the 64 background scan lines as to display each scan line of the 960 output scan lines (including image data). However, in order to avoid overflow or underflow occurring in the video data, a larger buffering space is usually required to be utilized in the conventional display device, for example, more line buffers or frame buffers are required in the conventional display device. The system cost will therefore increase significantly, which is a definite disadvantage for manufacturers

SUMMARY OF THE INVENTION

It is therefore one of the objectives of the present invention to provide a method for controlling a display device to maintain a same aspect ratio of input video images and output images by utilizing a smaller buffering space.

According to an embodiment of the present invention, a method for controlling a display device is disclosed. The method comprises: receiving an input video image, the input video image having a first aspect ratio and comprising a plurality of valid scan lines; controlling the display device to display a plurality of background scan lines at a first scan line frequency on a first display area; and controlling the display device to display an output image at a second scan line frequency on a second display area according to the valid scan lines, the output video image having a second aspect ratio; wherein the second aspect ratio is substantially equal to the first aspect ratio, and the second scan line frequency is substantially lower than the first scan line frequency.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
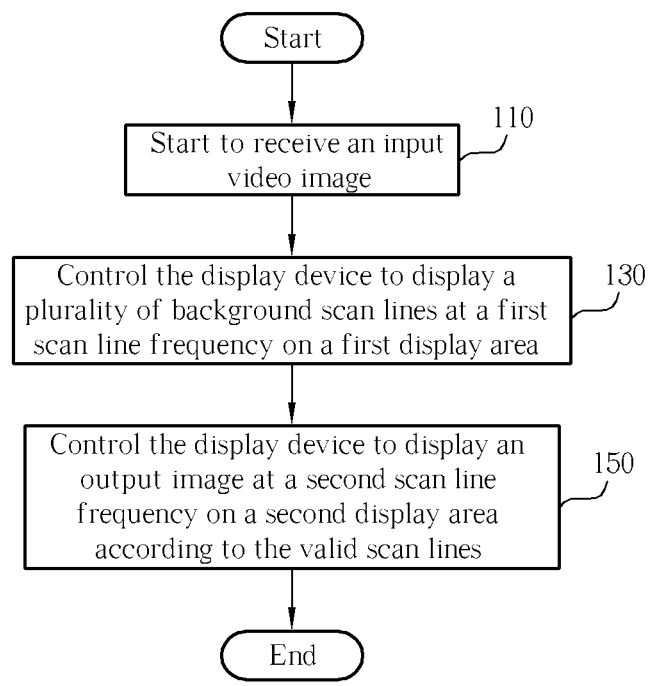
FIG. 1 is a flow chart showing a method for controlling a display device according to an embodiment of the present invention.

Please refer to FIG. 1. FIG. 1 is a flow chart showing a method for controlling a display device according to an embodiment of the present invention. The flow chart includes the following steps:

Step 110: Start to receive an input video image. The input video image has a first aspect ratio and includes a plurality of valid scan lines; the valid scan lines of the input video image have a third scan line frequency.

Step 130: Control the display device to display a plurality of background scan lines at a first scan line frequency on a first display area.

Step 150: Control the display device to display an output image at a second scan line frequency on a second display area according to the valid scan lines. The output video image has a second aspect ratio, wherein the second aspect ratio is substantially equal to the first aspect ratio x, and the second scan line frequency is substantially lower than the first scan line frequency.

An embodiment is illustrated in the following paragraphs to describe each step in the flow chart above. In this embodiment, the input video image complies with the VGA format, and the resolution is 640*480, therefore the first aspect ratio is 4:3, and a total number of valid scan lines is 480. Besides the valid scan lines, the input video image further includes 24 invalid scan lines. When the frame rate is 76 Hz, the third scan line frequency is equal to 38.3 kHz. Additionally, the resolution of the display device is 1280*1024. In order to maintain the aspect ratio to be constant, the horizontal part and vertical part of the input video image are both scaled up to be 2 times larger in this embodiment. Therefore, the resolution of the output image on the second display area is 1280*960 (in other words, the output image includes 960 output scan lines), and the second aspect ratio is 4:3. The first display area includes 1024−960=64 background scan lines.

In this embodiment, the display device is controlled to make the first scan line frequency of the 64 background scan lines higher than the second scan line frequency of the 960 output scan lines. An advantage of this method is to let data throughput of the display device outputting the 960 output scan lines match with data throughput of the display device receiving the 480 valid scan lines as far as possible. Therefore, the required buffering space will be reduced significantly thereby reducing the whole system cost.

If a first period length is utilized for receiving the 480 valid scan lines via the above exemplary method, then a second period length utilized for receiving the 960 output scan lines can be close to or equal to the first period length under a preferred condition. Since the total number of the valid scan lines is 480 and the third scan line frequency is 38.3 kHz, the first period length is equal to 480*(1/38.3), i.e. about 12.5 ms. When the second period length is equal to the first period length, the second period length will be equal to 960/12.5, i.e. about 76.6 kHz. In other words, a ratio between the total number 960 of the output scan lines and the total number 480 of the valid scan lines is equal to a ratio between the second scan line frequency 76.6 kHz and the third scan line frequency 38.3 kHz (both the two ratios are equal to 2 in this embodiment).

Taking an LCD panel as an example for the display device, in general, each time the LCD panel is required to output a scan line, it has to latch scan line data corresponding to the scan line to display the scan line correctly. In other words, each time a scan line is required to be displayed, the scan line data corresponding to a scan line is required to be latched. However, in the method shown in FIG. 1, since each background scan line can correspond to the same scan line data in the background scan lines shown in step 130, the latching operation is only required to be performed once. Thus, the step 130 can be further divided into the following two substeps:

Step 130: Latch the background scan line data corresponding to one of the background scan lines.

Step 150: Repeatedly output the background scan line data at the first scan line frequency to let the display device display the background scan lines on the first display area.

In this example, since the operation of latching the background scan line data is only performed once in step 131 and the background scan lines are displayed by repeatedly outputting the latched background scan line data, the time required for displaying each background scan line can be reduced, and the purpose of "letting the first scan line frequency be higher than the second scan line frequency substantially" can be attained. In other words, the time required to display each background scan line on the first display area can be less than the time required to display each output scan line on the second display area.

Figure 2:
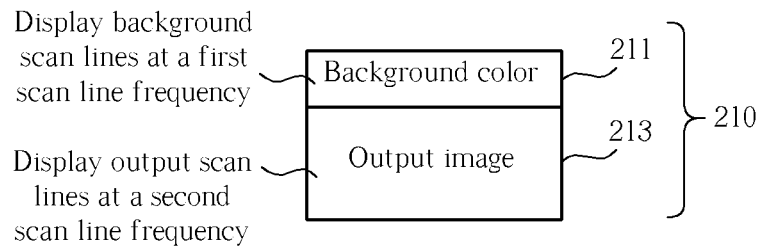
FIG. 2 shows three examples of frames finally outputted by the display device of the present invention.
Figure 2:
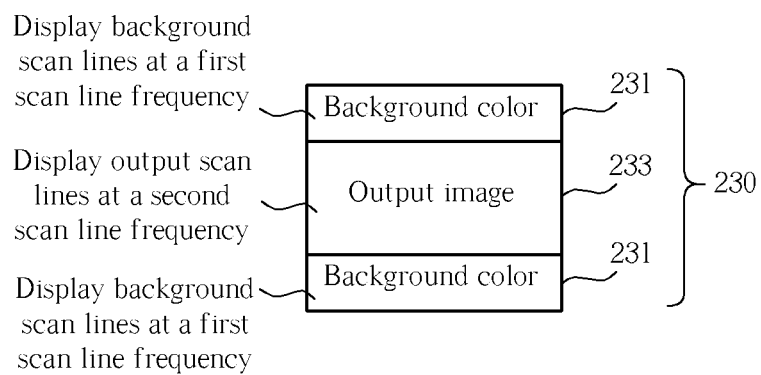
Figure 2:
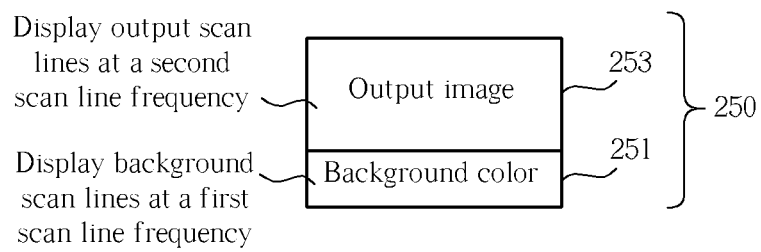

Please refer to FIG. 2. FIG. 2 shows three examples of frames finally outputted by the display device. In a final output frame 210, a second display area 213 is positioned below a first display area 211; in a final output frame 230, areas above and below a second display area 233 both belong to a first display area 231; in a final output frame 250, a second display area 253 is positioned above a first display area 251. Although the example of the final output frame 230 can provide a user with a better visual experience, the first display area 231 is divided into two sub-areas above and below, and therefore the operation of latching the background scan line data needs to be performed twice, so more time is required.

Please note that the flow chart shown in FIG. 1 is only an example of the present invention. In practice, the steps 110, 130, and 150 need not be in the exact order shown in FIG. 1. It is also practical to use other instructions to perform the steps 110, 130, and 150.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for controlling a display device, comprising:
   receiving an input video image, the input video image having a first aspect ratio and comprising a plurality of valid scan lines;
   controlling the display device to display a plurality of background scan lines at a first scan line frequency on a first display area; and
   controlling the display device to display an output image at a second scan line frequency on a second display area according to the valid scan lines, the output video image having a second aspect ratio;
   wherein the second aspect ratio is equal to the first aspect ratio, and the second scan line frequency is substantially lower than the first scan line frequency.

2. The method of claim 1, wherein the step of displaying the output image comprises:
   controlling the display device to display the output image in a second period length, the second period length being equal to a first period length utilized for receiving the valid scan lines.

3. The method of claim 1, wherein the valid scan lines of the input video image have a third scan line frequency, the output image comprises a plurality of output scan lines, and a ratio between a total number of the output scan lines and a total number of the valid scan lines is substantially equal to a ratio between the second scan line frequency and the third scan line frequency.

4. The method of claim 1, wherein the step of displaying the background scan lines comprises:
   latching background scan line data corresponding to one of the background scan lines; and
   repeating an output of the background scan line data at the first scan line frequency to display the background scan lines on the first display area.

5. The method of claim 1, wherein the second display area is positioned below the first display area.

6. The method of claim 1, wherein areas above and below the second display area both belong to the first display area.

7. The method of claim 1, wherein the second display area is positioned above the first display area.

* * * * *